US008840825B2

(12) United States Patent
De Santis et al.

(10) Patent No.: US 8,840,825 B2
(45) Date of Patent: Sep. 23, 2014

(54) MOLDABLE THERMOPLASTIC INSERTS

(71) Applicant: JD and SW, LLC (a Nevada LLC), Las Vegas, NV (US)

(72) Inventors: Jeffrey De Santis, Newport Beach, CA (US); Scot A Wiesemann, Newport Beach, CA (US)

(73) Assignee: JD & SW, LLC, (Nevada LLC), Las Vegas, NV (US)

( * ) Notice: Subject to any disclaimer, the term of this patent is extended or adjusted under 35 U.S.C. 154(b) by 0 days.

(21) Appl. No.: 13/794,111

(22) Filed: Mar. 11, 2013

(65) Prior Publication Data

US 2013/0256947 A1 Oct. 3, 2013

Related U.S. Application Data

(62) Division of application No. 12/352,539, filed on Jan. 12, 2009, now Pat. No. 8,414,811.

(60) Provisional application No. 61/020,352, filed on Jan. 10, 2008.

(51) Int. Cl.
*B29D 35/12* (2010.01)
*B29C 45/00* (2006.01)

(52) U.S. Cl.
CPC ................................. *B29C 45/0003* (2013.01)
USPC ............................ 264/259; 264/241; 264/250

(58) Field of Classification Search
CPC ................................................... B29C 45/0441
USPC ............................................ 264/259, 250, 241
See application file for complete search history.

(56) References Cited

U.S. PATENT DOCUMENTS

| 3,302,243 | A | * | 2/1967 | Ludwig ........................ 425/453 |
| 3,641,688 | A | | 2/1972 | von den Benken |
| 4,413,429 | A | | 11/1983 | Power |
| 4,418,483 | A | | 12/1983 | Fujita et al. |
| 4,433,494 | A | | 2/1984 | Courvoisier |
| 4,503,576 | A | | 3/1985 | Brown |
| 4,901,390 | A | | 2/1990 | Daley |
| 5,902,276 | A | | 5/1999 | Namey, Jr. |
| 5,922,264 | A | | 7/1999 | Shimmell |
| 7,207,125 | B2 | | 4/2007 | Jeppesen et al. |

* cited by examiner

*Primary Examiner* — Galen Hauth
(74) *Attorney, Agent, or Firm* — Curtis L. Harrington; Harrington & Harrington

(57) ABSTRACT

An apparatus for cushioning and protecting body parts of a human or animal is described. The apparatus includes a blend of dual durometer resilient flexible materials with a plurality of degrees of hardness to personalize the properties of comfort, proper fit, structure, and protection. The resilient flexible materials comprise thermoplastic, thermoset, casting, curing, epoxy, or resin materials, and a soft part is customizable.

2 Claims, 20 Drawing Sheets

MOLDABLE THERMOPLASTIC INSERTS

RELATED APPLICATION

This application claims priority from U.S. Provisional No. 61/020,352 filed on Jan. 10, 2008 and entitled "MOLDABLE THERMOPLASTIC INSERTS."

BACKGROUND

There exists a multitude of products which are designed to conform to individual body parts. Examples of these products are demonstrated in a wide array of settings, from personal daily usage such as footwear, chair seats, lumbar supports, pillows and beds to sporting equipment such as shin guards, helmets, mouth guards and other protective gear.

The purpose of these products is generally to provide the benefits of comfort, support, protection and shock absorption to the user. These products can be generic or, more preferably, can be customized to fit a particular individual's body part.

There have been a number of approaches to providing custom-fitting insoles for footwear. One approach over the past twenty years with mixed success utilizes foams, silicone foams and silicone. The raw materials however are generally expensive, difficult to use and may generate hazardous fumes. Furthermore, the resulting products are fitted by a professional sales person and can only be fitted once. Additionally, since these products are not remoldable and can not be reused, if an error is made in the fitting process, the product is discarded and the process restarted.

In an alternative approach, a layer of a thermoplastic material is provided for in a shoe, sandal, or insole. The thermoplastic material is heated, thus softening it, and the individual desiring to wear the footwear steps into the shoe and makes an impression. The material then cools, retaining the impression of the foot. See U.S. Pat. Nos. 3,641,688; 4,413,429; 4,433,494; 4,503,576; 3,895,405; and 4,901,390. The content of all the foregoing patents is incorporated herein by reference. However, most of the foregoing thermoplastic materials are foams which have poor compression set properties and break down and compress over time, others are non-foams which are unduly hard, have unduly high specific gravity, and have insufficient elasticity and resilience. In addition, body heat itself can soften or at least increase the flexibility of the pad, thereby decreasing the effectiveness of the protection offered by the pad.

SUMMARY

Unlike the above-described products, the composition is preferably light-weight yet firm enough to provide absorbency, resiliency and support while maintaining flexibility and allows a post-purchase custom-fit which provides comfortable use through conformation to a specific body part of a human or animal.

Furthermore, the composition is preferably firm enough to provide foot load absorbency, resiliency and arch support, while maintaining enough flexibility to allow comfortable use through conformation to the user's feet.

Various embodiments of the disclosure provide custom-fitting articles which can have one or more of the following characteristics: a) low raw material costs; b) lightweight; c) foamed; d) co-molded dual durometer thermoplastic; and e) initially provides a well-defined impression of the body part; post-purchase can be formed to the individual at less than about 200° F. The custom-fitting articles can be durable, flexible, resilient, and long-lasting, and can be quickly molded by the purchaser at home. Furthermore, the custom fitting articles can be reheated and adjusted to improve the fit or to adapt the invention to minor changes in anatomy.

A method of manufacture of inserts includes a novel combination of plastics and foaming agents which are manufactured together in a single tool using a two-shot process, or any derivative thereof, using little or no manual manipulation which combines the materials into two parts; a support type structure having a harder finish; and a comfortable comfort structure comprising a softer finish. The harder finish support type structure may or may not further utilize a combination of thermoplastic materials and foaming or blowing agents to create a hard yet light weight support structure. The softer finish comfort structure includes a combination of plastics and foaming agents to produce a final structure that is conformable to a users body part and soft enough to provide a comfortable presence in relation to said body part while the harder finish provides structural support to said body part.

Various embodiments of the disclosure can provide a balancing of the structural rigidity and support of harder materials that may be made more light-weight with foaming agents yet still maintain the structural rigidity to provide support and/or protection of a user's body part. This capability seeks to balance the comfort level of the device versus the rigidity and support/protection, by having the conformable softer materials in direct contact with a user's body part providing a conforming and comfortable custom fitted cushioning barrier, while protecting the user from both the external forces (e.g., ground forces with an insole, or kicking forces with a shin-guard) and from the rigid structural support of the invention itself.

Various embodiments of the disclosure may comprise thermoplastic materials such as styrene and/or olefinic block copolymer thermoplastic elastomers (SBCs) having differing hardnesses as measured by the Shore® Durometer test. When an insole is the contemplated moldable article, the harder SBC forms the arch and heel portion of the insole while the softer SBC is used to form the non-arch portion of the insole. These two dual durometer pieces are injection molded and adhered to one another by way of mechanical and chemical bonds thus forming a single solitary piece during the manufacturing process.

In embodiments where both the harder arch and heel portion of the insole and the softer non-arch portion of the insole include foaming or blowing agents, the ratios of foaming/blowing agents to thermoplastic elastomers are preferably greater in the softer non-arch portion of the insole as compared to the harder arch and heel portion when the same blowing and thermoplastic agents are used in both the harder and softer portions.

A shoe can be equipped with a customized insert in accordance with the disclosure. These inserts can be placed at the heel and/or upon all or some of the length of the insole. An insole is preferably firm enough to provide customized support at the arch and heel, thereby helping to prevent pronation caused by knee injuries, yet soft enough to absorb much of the shock and strain associated with walking, running or other activities.

Various embodiments of the disclosure can be used in the sporting equipment field for custom-shaped articles, such as shin guards, helmets and the like.

It is further contemplated that the moldable articles could be used in a preventative manner or as a means to treat injuries for both humans and animals (i.e., shin wraps for race horses, casts for injured animals).

It is also contemplated that colors and/or scents can be added to achieve desired effects.

It is further contemplated that antimicrobials may be added to to achieve desired effects.

DETAILED DESCRIPTION

Figure 1:
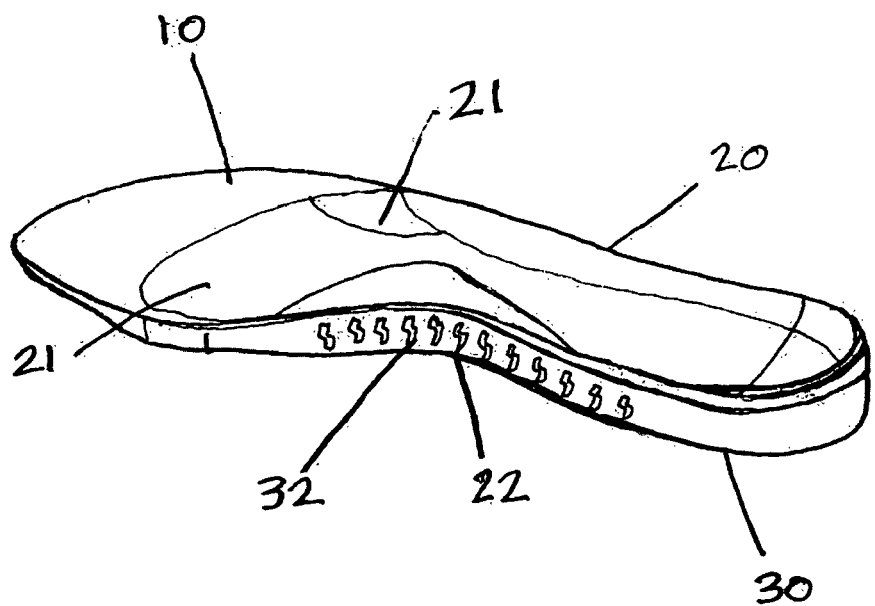
FIG. 1 is a perspective view of an example of an insole.
Figure 2:
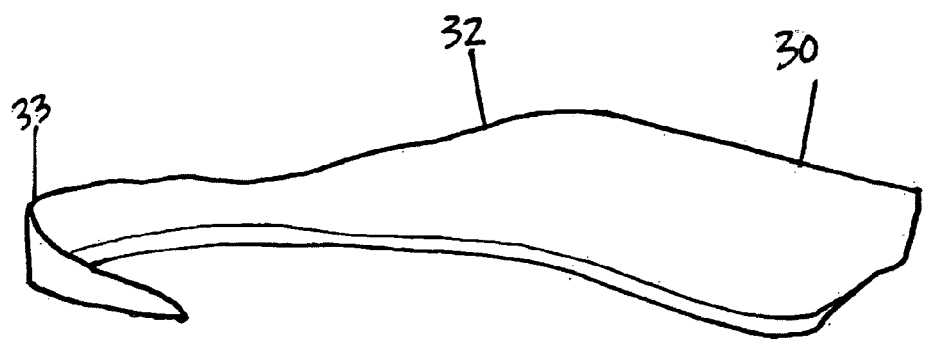
FIG. 2 is a perspective view of a harder arch/heel portion of the insole of FIG. 1.

The disclosure provided herein describes, among other things, a novel heat moldable composition, a process for making said composition and utilitarian devices made of said composition. Briefly, various embodiments of the disclosure include a novel combination of resilient flexible materials having varying degrees of hardness as measured by the Shore® Durometer test. These resilient flexible materials may comprise a thermoplastic, thermoset, casting, curing epoxy, resin, or other like material which may or may not also be blended with chemical blowing or foaming agents. When thermoplastic elastomers are used to make a footwear insole 10, as shown in FIGS. 1-12, the harder thermoplastic elastomer may be blended with a blowing/foaming agent and is used to form the arch and heel portion 30 of the insole while the softer thermoplastic elastomer is blended with a blowing/foaming agent to form the non-arch portion 20 of the insole. These two dual durometer pieces are two shot/co-injected molded and adhered to one another by way of mechanical and/or chemical bonds thus forming a single solitary piece.

The non-arch portion 20 includes an indentation 21 for the ball of the foot of a user. Preferably a forward portion of the arch and heel portion 30, in the vicinity of the indentation 21, is configured to a width such that four toes (the large toe through the fourth-toe) are positioned over the forward portion, but the fifth toe (the small toe or pinky) is not. The arch and heel portion 30 includes and arched surface 32 and a "J" shaped portion 33 configured to align and retain the heel of a foot.

Depending upon the relative proportions of the aforementioned ingredients, the texture of the composition can range from soft and gel-like to hard and rubbery. Further, the proportions can be adjusted so as to offer, to varying degrees of shock absorbing and support properties, said support properties being directly related to the compression set and frequency of loads of the composition.

Figure 3:
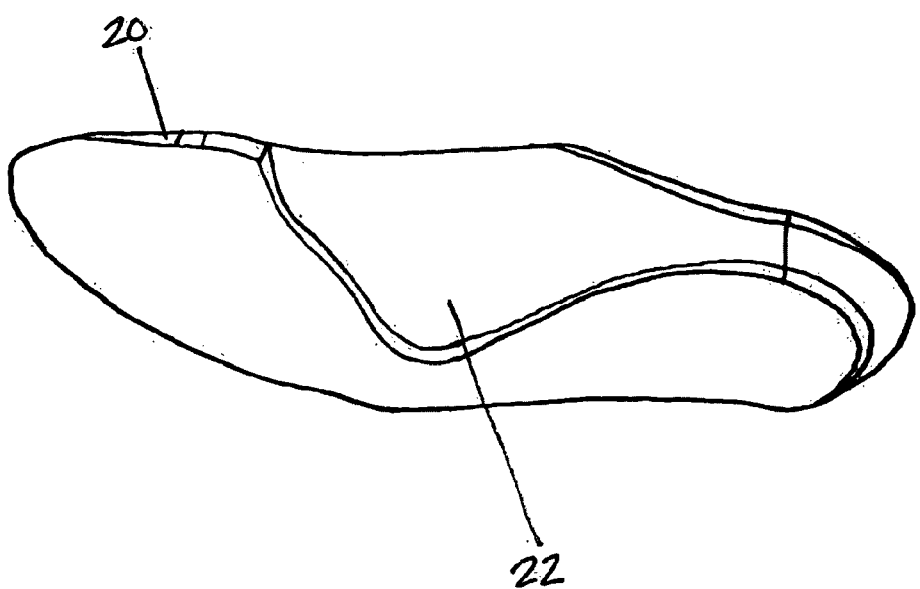
FIG. 3 is a perspective view of a bottom surface of a softer non-arch portion of the insole of FIG. 1.
Figure 4:
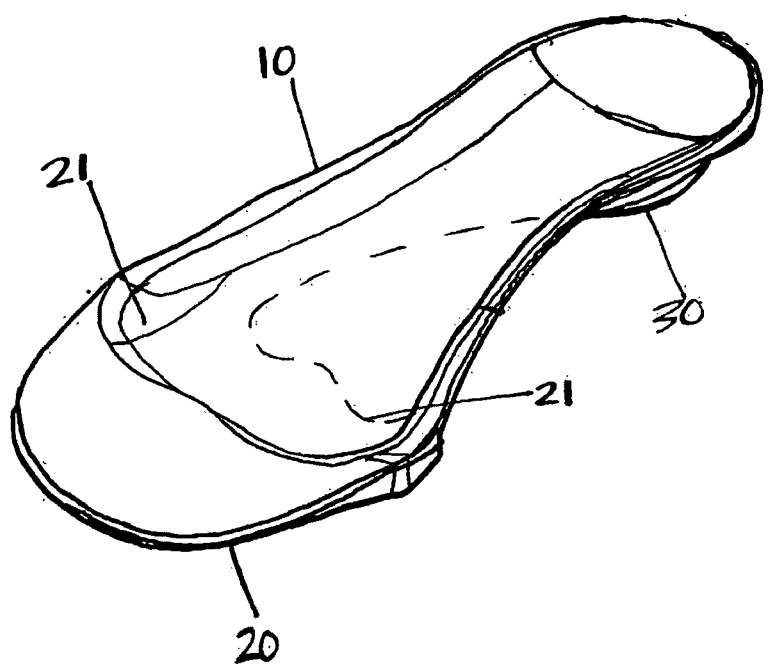
FIG. 4 is a perspective view of a upper surface of the insole of FIG. 1.
Figure 5:
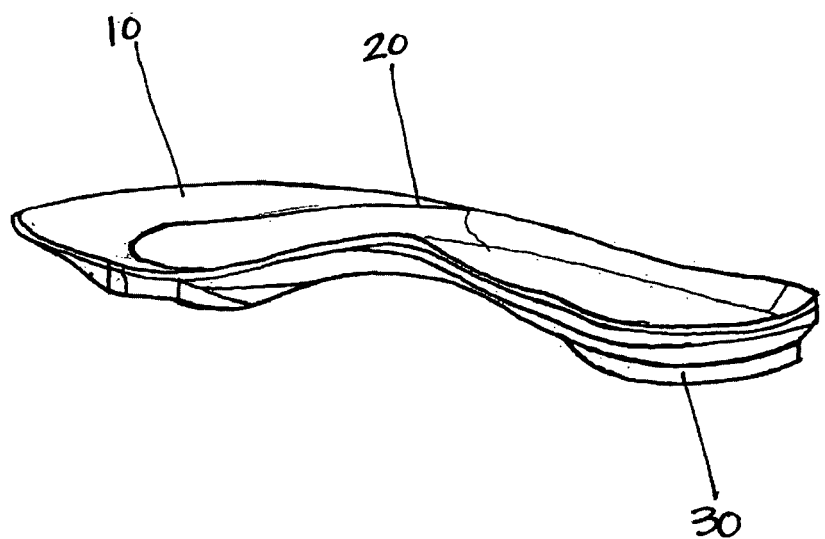
FIG. 5 is a left side perspective view of a right foot insole.
Figure 6:
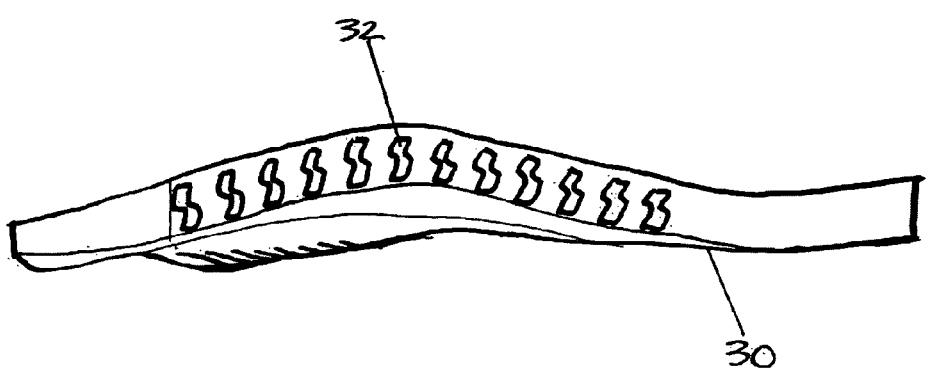
FIG. 6 is a left side planar view of a right foot insole.
Figure 7:
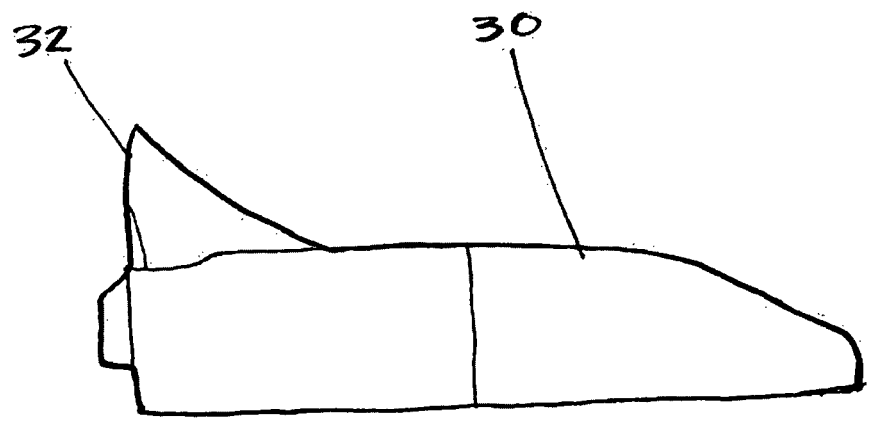
FIG. 7 is a rear planar view of a right foot insole.
Figure 8:
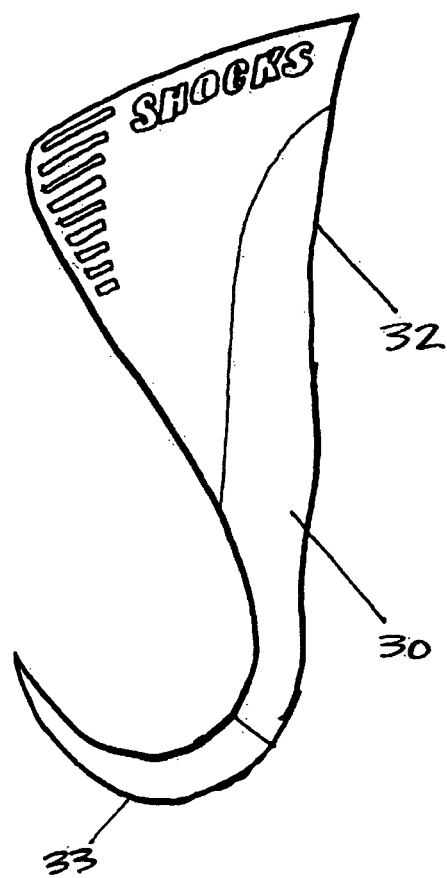
FIG. 8 is a bottom planar view of the harder arch portion of the insole of FIG. 1.
Figure 9:
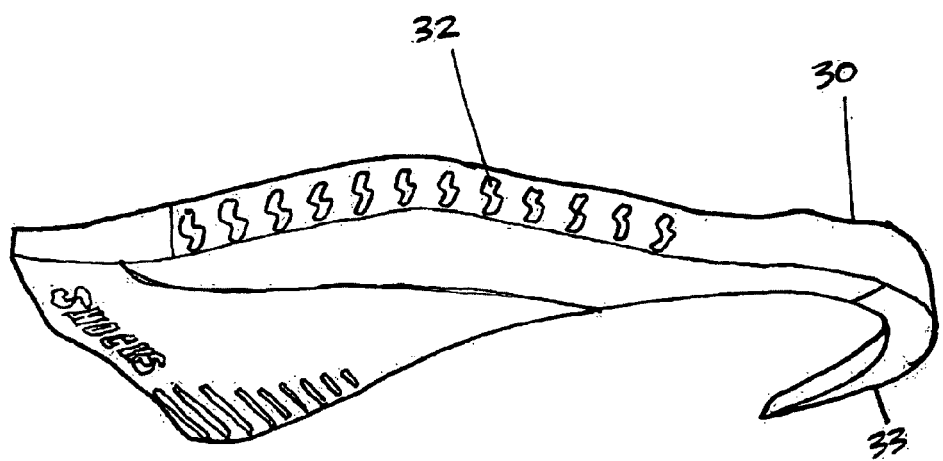
FIG. 9 is a bottom perspective view of the harder arch portion of the insole of FIG. 1.

Essentially, the footwear insole 10 is created, as best shown in FIGS. 3 and 4, by securing the arched surface 32 of the arch/heel portion 30 to the lower surface 22 of the non-arch portion 20 of insole 10. As a way of example, but not to be limiting, the arch/heel portion 30 and the non-arch portion 20 may be secured to one another by chemical or mechanical means based upon similar chemistries of the polymers, or alternatively by way of an adhesive alone or in combination with the other means.

An embodiment features the non-arch portion 20 and the arch/heel portion 30 bonded to one another in the same injection mold or tool using a two-shot co-injection process. The first shot comprising the harder arch/heel portion material is shot; the mold or tool is immediately or contemporaneously rotated and the second shot softer non-arch portion 20 material is shot. As the two materials are allowed to cool together while in direct contact the chemical similarities and/or similar chemistries of the two materials create chemical bonds between the materials and fuse the two pieces into one.

Figure 10:
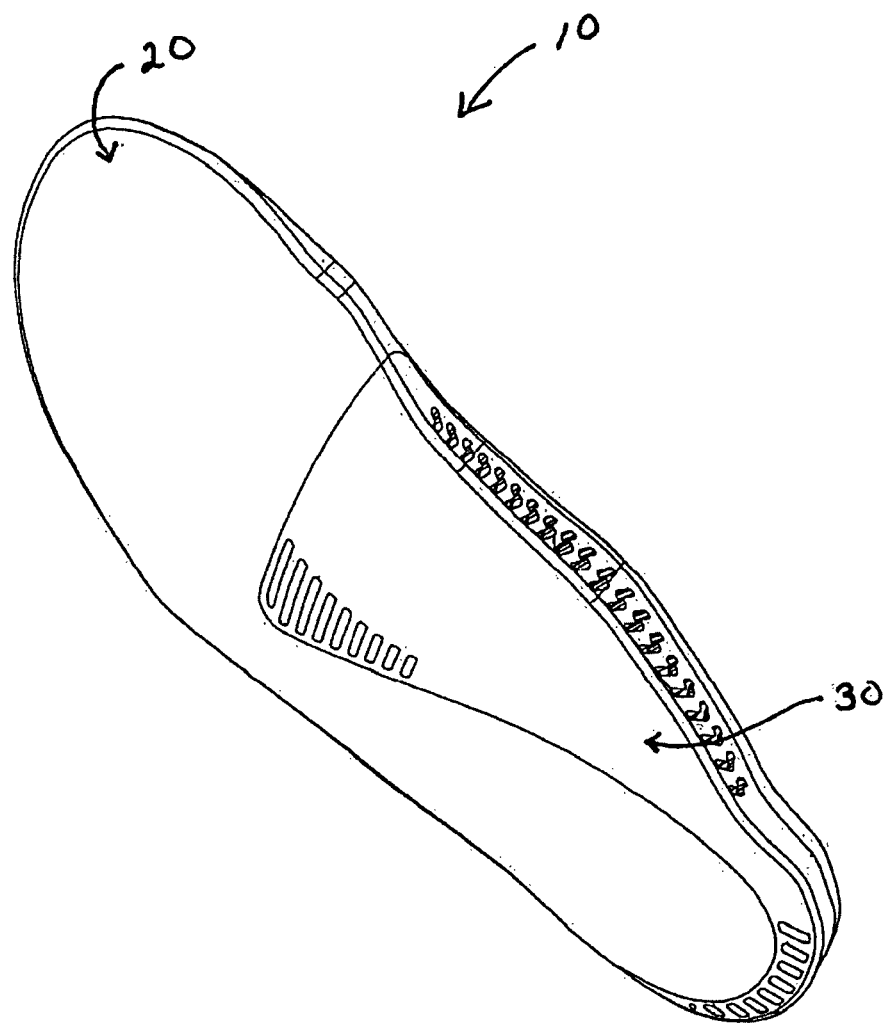
FIG. 10 is a bottom perspective view of a right foot insole.
Figure 11:
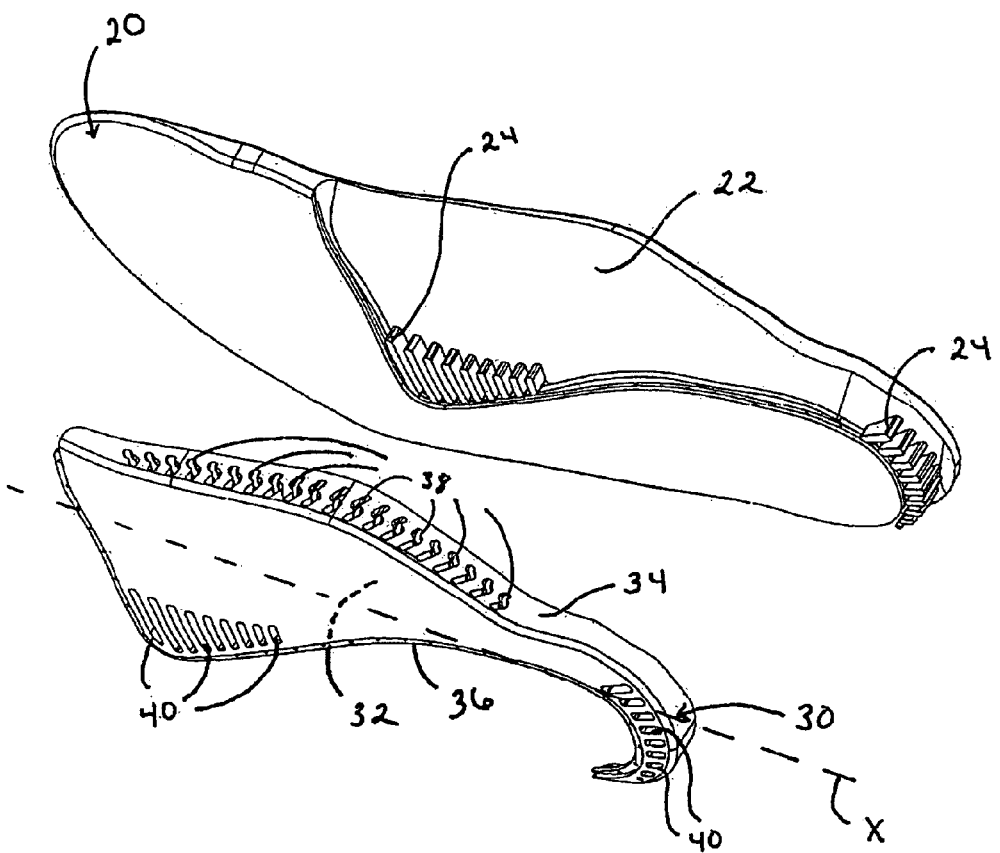
FIG. 11 is a bottom perspective view of both the arch portion and non-arch portions before mating to form an insole.
Figure 12:
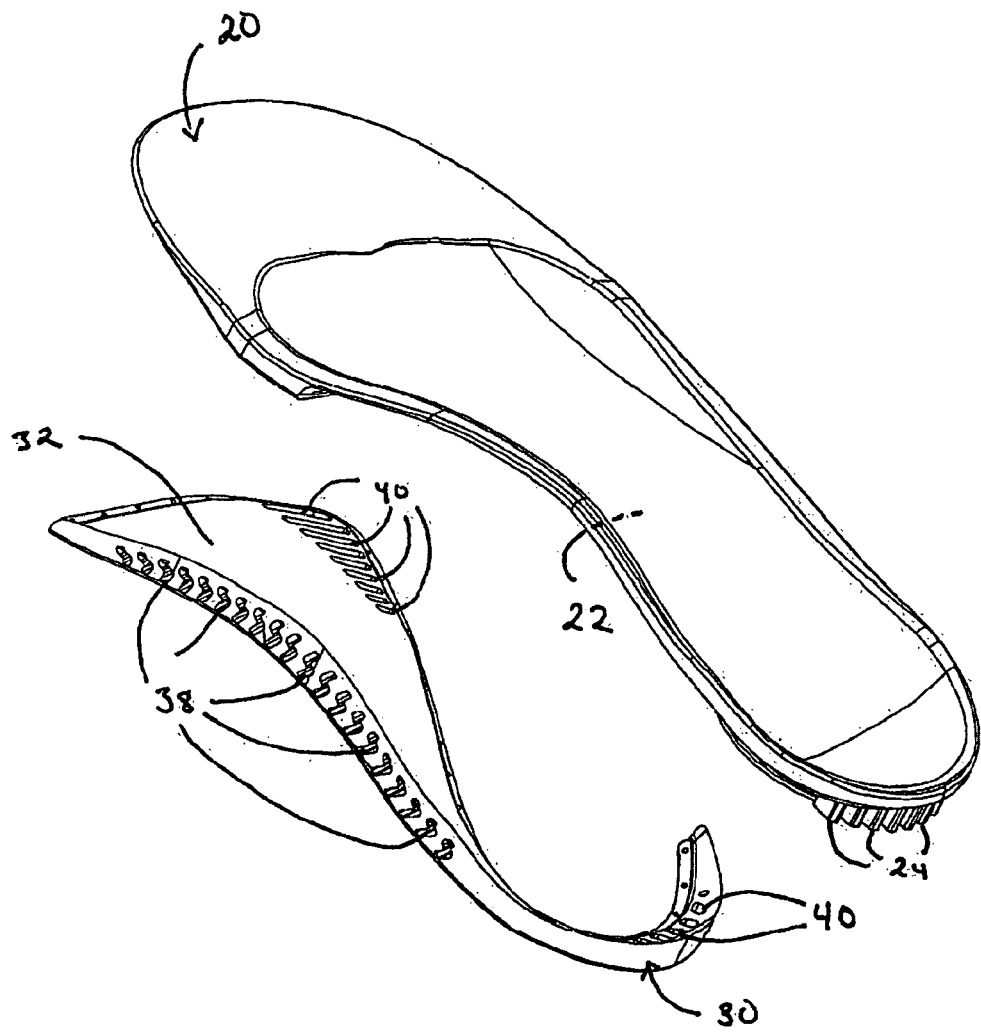
FIG. 12 is a top perspective view of both the arch portion and non-arch portions before mating to form an insole.

Another embodiment illustrated in FIGS. 10-12 features the non-arch portion 20 and the arch/heel portion 30 are bonded to one another in the same injection mold or tool using a two-shot co-injection process. The first shot comprising the softer non-arch portion 20 material is shot; the mold or tool is immediately or contemporaneously rotated and the second harder arch/heel portion 30, as the two materials are allowed to cool together while in direct contact the chemical similarities and/or similar chemistries of the two materials create chemical bonds between the materials and fuse the two pieces into one.

Arch/heel portion 30 may be molded from a unitary piece of resiliently flexible material such as a thermoplastic, polyurethane, polyethylene, nylon polycarbonate, ABS, thermoset, casting, curing epoxy, resin, or other like materials. Optionally, the resiliently flexible material or arch/heel portion 30 may be blended with a foaming or blowing agent or a chemical foaming agent (CFA) or chemical blowing agent (CBA).

FIGS. 11 and 12 illustrate an embodiment wherein the arch/heel portion 30 includes an arched surface 32 that reflects the contours of the bottom of a human foot. Arch/heel portion 30 slowly tapers in thickness from edge 34 to edge 36. Channels 38 are positioned perpendicular to the longitudinal axis X of the arch/heel portion 30. The channels 38 are "Z" shaped and are configured to provide for compression when under pressure and provide for a rebound/recovery upon the pressure being unloaded. Arched surface 30 further contains bores 40 which mate with fingers 24 located on the non-arch portion 20.

In various embodiments, the thermoplastic polymer of the arch and heel portion 30 is a styrene block copolymer thermoplastic elastomers (SBCs). The base polymers have end blocks of polystyrene with a rubbery midblock of either polybutadiene (SBS) or poly(ethylenebutylene) (SEBS). These polymers behave like rubber at ambient temperatures but flow like thermoplastics when subjected to heat and pressure. Preferably, the thermoplastic material has a Vicat softening point of 100°-500° F. The thermoplastic material also has the following physical characteristics at ambient or other standard conditions: Shore hardness of Shore 50A-85D, preferably 70A-55D, more preferably 80A-45D, tensile strength of 1000-6000 psi, more preferably 2000-3000 psi, compression set at 24 hours at room temperature of 10%-60%, preferably 15%-25%, more preferably about 20%, flexoral modulus of about 100 kpsi to about 300 kpsi, elongation at break of 200-1000 percent, more preferably 300 to 500 percent, and specific gravity of less than 1.2, more preferably less than 1.1, more preferably less than 1, more typically about 0.91, prior to foaming if foaming is present. Low density and light weight are desirable characteristics for insoles and footwear. The shoe insert is stable so that it can be used at 160° F. for 6 months or longer without significant deterioration or loss of physical properties. Preferably, the two materials have a chemical similarity so that they bond and stick.

Non-arch portion 20 is molded from a blend comprising a (i) a thermoplastic material and (ii) a foaming or blowing agent or a chemical foaming agent (CFA) or chemical blowing agent (CBA).

Non-arch portion 20 is molded from a softer flexible material and includes a lower surface 22 that mirrors the contours of the arched surface 32 of arch/heel portion 30. Lower surface 22 may includes fingers (not shown in this embodiment) protruding transversely outward. Fingers located on the non-arch portion 20 can mate with bores (not shown in this embodiment) located in the arch/heel portion 30.

Preferably, the thermoplastic polymer of the non-arch portion 20 is a styrene block copolymer thermoplastic elastomers (SBCs) similar to that described above and used for production of the arch/heel portion 30. However, the SBC of preference for this component has a softer durometer.

Preferably, the thermoplastic material of the non-arch portion 20 has a Vicat softening point of 100°-500° F., has a consistency at 150-212° F. approximately like masticated chewing gum so that an effective impression of the foot can be made, and has the following physical characteristics at ambient room temperature or other standard conditions: Shore hardness of 10A-75A, preferably 20A-50a, more preferably 25A-40A, tensile strength of 1000-6000 psi, more preferably 2000-3000 psi, compression set at 24 hours at room temperature of 10%-60%, preferably 15%-25%, more preferably 20%, elongation at break of 200-1000 percent, more preferably greater than 500 percent, and specific gravity of less than 1.2, more preferably less than 1.1, more preferably less than 1, more typically about 0.89 prior to foaming. It is a foam or blowing agent blend and can be adjusted multiple times and preferably can be conformed to the underside of a person's foot while at 140°-200° F., more preferably 150°-170° F., more preferably about 160° F.

Additional thermoplastic polymers that are useful in the present invention may include but are not limited to polyethylene or cross-linked ethylene vinyl acetate foam, cross-linked polyethylene, poly(ethylene-vinyl acetate), polyvinyl chloride; and/or functional polyolefins such as ethylene-ethyl, acrylic copolymers, ethylene-vinyl acetate (EVA); an acrylic, synthetic and natural latex rubbers, block polymer elastomers, thermoplastic elastomers, polystyrene, ethylenepropolene rubbers, silicone elastomers, polystyrene, polyurea or polyurethane, a polyurethane foam, an elastomeric foam, a moldable foam, a non-foam elastomer, a olefinic elastomer, a silicone gel, a viscoelastic material, and combinations thereof.

To achieve the desired characteristics of the insole, chemical blowing agents (CBAs) are blended into the thermoplastic material discussed above. The ratio of this blend is preferably about 0.01% to about 10%, more preferably about 1% to about 5%. It is to be appreciated however, that a person of ordinary skill in the art can adjust the ratio of ingredients to attain a composition with the desired qualities.

Foaming agents, or chemical foaming agents (CFAs), are sometimes referred to as chemical blowing agents and are used to foam plastics, rubber, and thermoset resins to impart a cellular structure to the material. Chemical foaming agents decompose to release gas when heated to their activation temperature. A broad variety of chemical foaming agents such as, but not limited to endothermic and exothermic foaming agents, with different activation temperatures, may be used thus allowing selection of the correct foaming agent and percentage to match the processing conditions. Preferably, an exothermic blowing agent is used.

Further additives such as gelling agents which imparts rigidity or stiffness to the final composition, softening agents which controls the flowability (malleability) of the final composition may be further employed. In the heated state, the softening components makes the final composition more malleable. Preferable softening agents include oils. Other suitable gelling agents may include, but are not limited to, polyethylene, polypropylene, polybutene-1, poly(tetramethylene oxide), and poly(oxypropylene). Block copolymers such as poly(styrene-b-butadiene), and poly(styrene-b-isoprene) may also be used.

Preferably, suitable softening agents are non-toxic, and have no smell. In accordance with a preferred embodiment, the softening agent is mineral oil. Suitable softening agents may include, but are not limited to, dodecane, diamylphthalate, dibutylsebacate, diisodecylphthalate, dioctyladipate, dioctyl phthalate, dioctylsebacate, ethylbenzoate, tricresyl phosphate, turpentine, pine oil, propyl butyrate, Solvesso 150 and terpene.

Each ingredient contributes a different characteristic to the final product. For example, when a higher proportion of thermoplastic polymer is utilized, the end product will be harder but will be heavier. When a higher proportion of chemical blowing agents is utilized, the final product will be softer and more light-weight. When the proportion of resiliency component is increased, the final material will be more flexible. A drawback of increasing the amount of resiliency component is that the molding temperature will be higher. It is appreciated that a person of ordinary skill in the art can adjust the ratio of ingredients to attain a composition with the desired qualities.

The articles are manufactured using a rotary, two shot, tool indexing technique wherein two different injection ports are injected into the same mold unit before either part, substrate or overmold, are ejected from the mold. The substrate mold is injected with plastic while the overmold cavity is collapsed thus allowing the material to shut off at the edges around the substrate. After this substrate fills the tool, the tool indexes while simultaneously the core that was collapsed in the first injection process retracts, thus creating the void for the second injection material to fill. The two materials bond as they cool together. And finally the completed product is ejected from the tool as a single piece.

A method for manufacturing an apparatus for cushioning and protecting a body part of a human or animal may comprise the following:
  i) a mold is created with multiple cavities outlining a body part to be protected;
  ii) a first shot of a thermoplastic resin is injected into a first cavity of the mold;

iii) the mold is rotated either manually or automatically and a second mold cavity is exposed, the cavity may be exposed when a core/insert inside the mold retracts upon rotation, or shortly thereafter, and vacating of the area by the core/insert creates a second cavity;

iv) a second shot of a similar or different thermoplastic resin is injected into the second cavity of the mold;

v) the entire apparatus is allowed to cool and set; in doing so the first and second shot thermoplastic resins bond mechanically based on utilizing fingers and bores that physically interrelate the two resins in physical proximity; and/or chemically via the surface area interaction of the two resins before either resin is allowed to cool completely. The similar molecular structures and the surface area proximity of the two thermoplastic resins facilitate the chemical bonding of the two shots.

An example of manufacturing molds used for manufacturing the insole 10 are illustrated in FIGS. 13-17.

Figure 13:
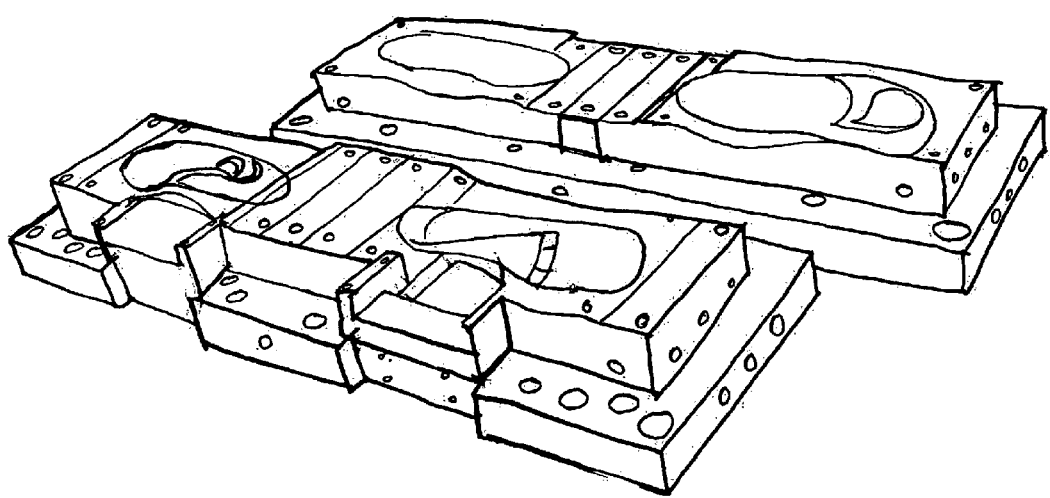
FIG. 13 is a top perspective view of 4 molds used to produce insoles for both a left and right foot.
Figure 14:
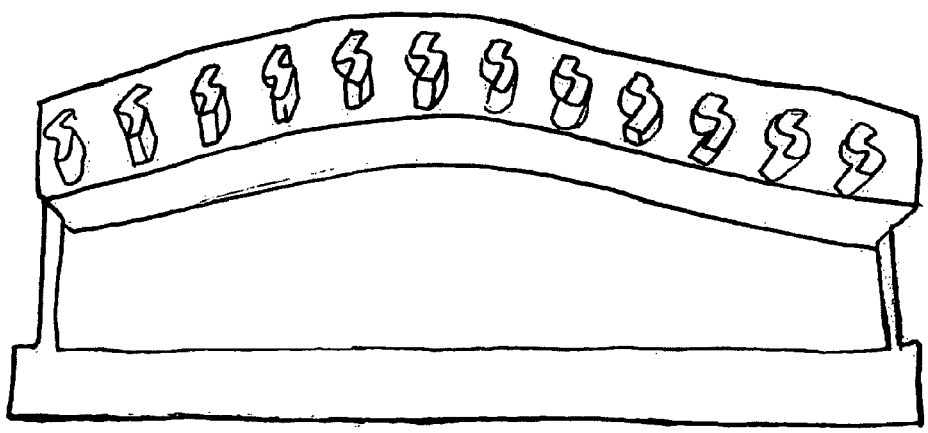
FIG. 14 is a top planar view of a sliding core which produces a medial "z" structure in the finished insole.
Figure 15:
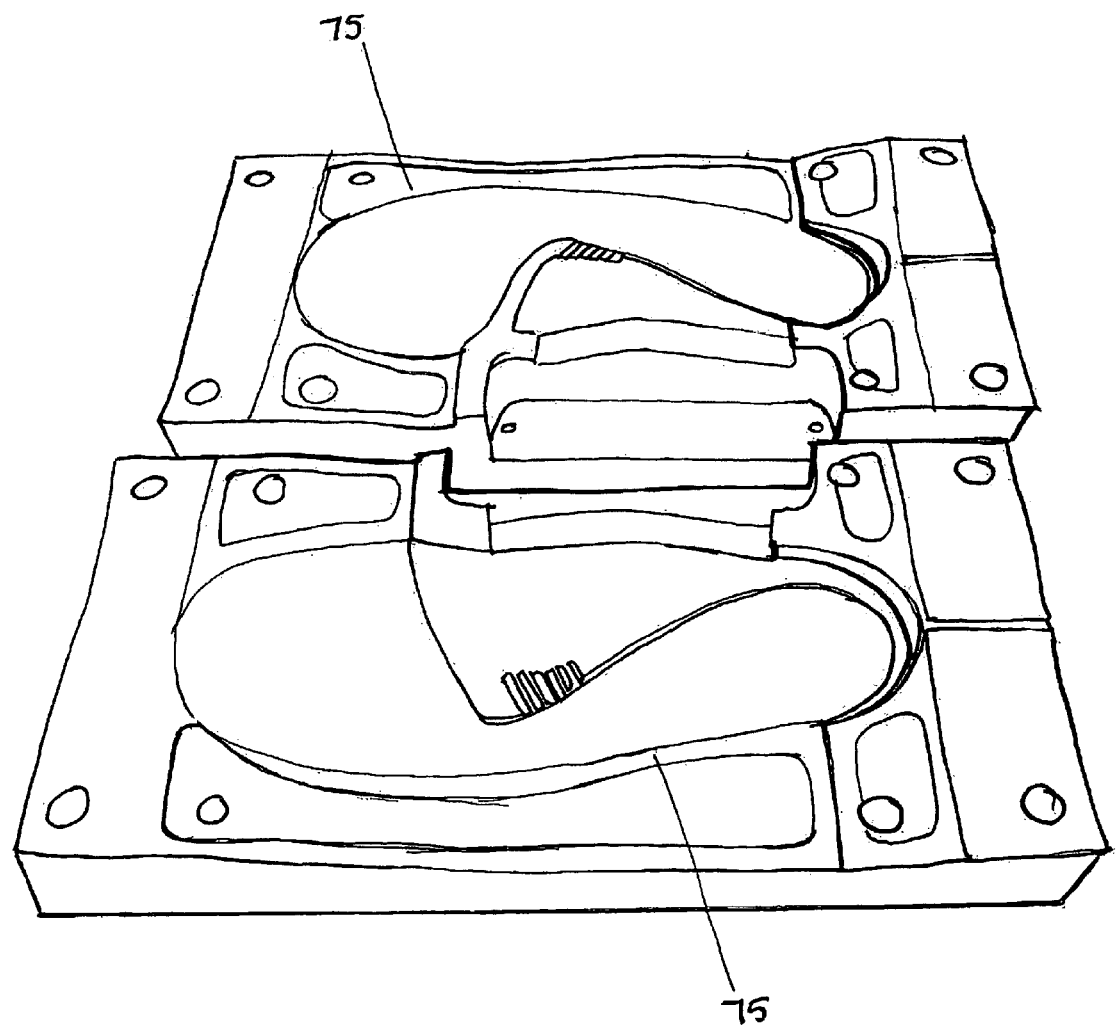
FIG. 15 is a top planar view of a left and right foot arch portion cavity molds.
Figure 16:
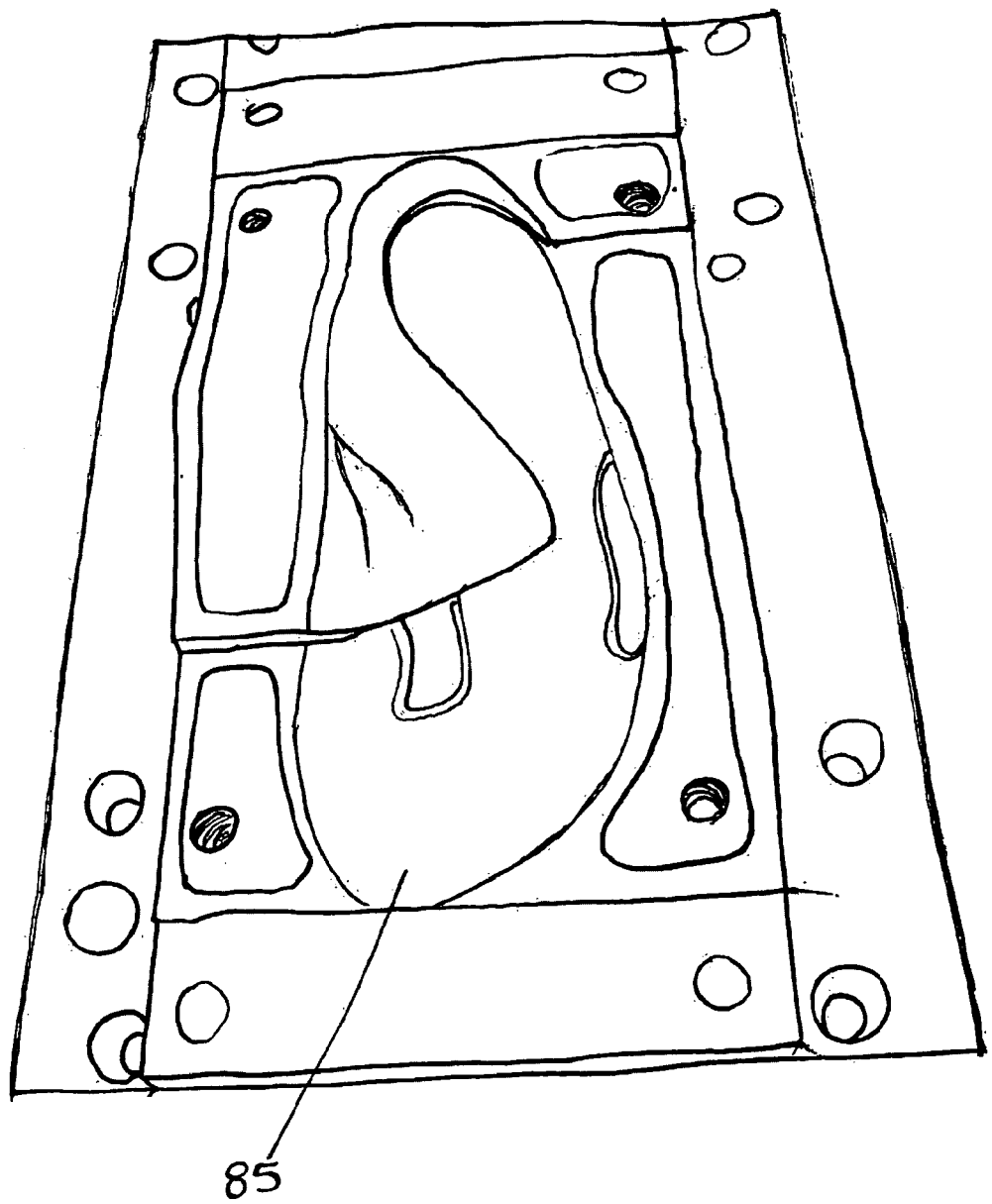
FIG. 16 is a top planar view of a left foot non-arch portion cavity mold.
Figure 17:
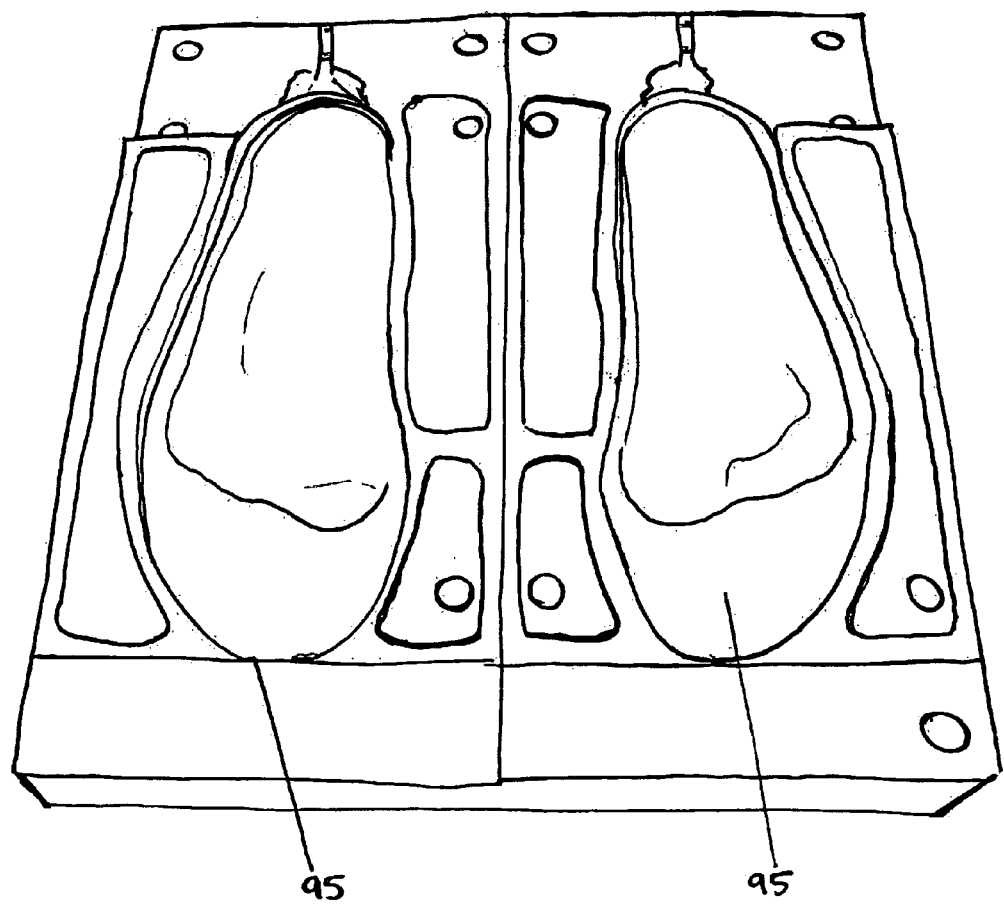
FIG. 17 is a top planar view of left and right foot stationary/cover molds.

A full set of molds for both the left ant right feet are present in FIG. 13. A mold is created outlining a human foot, a first mold 75 demonstrated in FIG. 15 molds the harder arch and heel portion of the insole; and a second mold (or the first mold with a vacated core/insert) 85 demonstrated in FIG. 16 molds the softer non-arch portion and stationary cover mold 95 demonstrated in FIG. 17 outlines the entire insole. FIG. 14 shows a core/insert used to produce a medial "z" structure in the finished insole.

Another method for manufacturing the insole 10 may comprise the following:

i) a mold is created outlining a human foot, a first cavity of the mold outlines the arch and heel portion of the foot; and a second cavity outlines the entire foot;

ii) the arch/heel portion 30 is first formed by melting and injecting the desired thermoplastic material into the first cavity of the mold. The mold may have additional features such as texture to aid engagement between the exchangeable innersole and the orthopedic intermediary support member, indicia, or other markings;

iii) the mold is rotated either manually or automatically and a second mold cavity is exposed when a core/insert inside the mold retracts upon rotation, or shortly thereafter, and the area vacated by the core/insert thus creates a second cavity;

iv) simultaneously the non-arch portion 20 is formed by blending a thermoplastic material having a lower durometer than that used for the arch/heel portion 30 with a chemical foaming agent. The blended material is subsequently melted and injected into the second cavity of the mold;

v) as the insole 10 is allowed to cool and set, both the arch/heel portion 30 and the non-arch portion 20 are mated and mechanically locked or bonded together by way locking fingers 24 into bores 40. Furthermore, the arch/heel portion 30 and the non-arch portion 20 are chemically bonded with another via the surface area interaction of the two resins before either resin is allowed to set. The similar molecular structures and the surface area proximity of the two thermoplastic resins facilitate the chemical bonding of the two portions 30 and 20.

Upon setting up at room temperature, the composition will retain its consistency as well as the shape it was given in the molding process. The composition, once set-up, has shock absorption properties and may be used as such. The pieces can be customized to fit article of footwear. This permits the braces to be recasted/adjusted to accommodate changes in patient's condition, such as swelling. By incorporating an environmentally safe thermoplastic polymer, the composition itself is environmentally safe. The composition may be incorporated into products during the manufacturing process or as separate inserts to be used with existing stock products.

As discussed above the insole may be custom-fitted to the foot of a person by heating it to a pre-selected softening point such as 150°-200° F. to soften the thermoplastic material, firmly placing the user's foot on the insole 10 and conforming the insole to the underside of the person's foot, after the impression is made the insole 10 is allowed to cool to ambient temperature (typically about 5 minutes) at which time the impression is fixed. If the fit is not right, the insole 10 can be reheated, and adjusted to improve the fit by repeating the process.

It is also contemplated that colors and/or scents can be added to the compositions to achieve desired effects.

In an alternative embodiment, antimicrobial agents may be combined with the thermoplastic material. Antimicrobial agents such as, but not limited to metallic ions, such as Ag, Au, Pt, Pd, Ir (i.e., the noble metals), Cu Sn, Sb, Bi and Zn, as well as many heavy metals are effective antimicrobials.

Metallic antimicrobials function by releasing metal ions into the microbe. The released ions react with protein and other anions (negative charged species) in the microbe and render the protein insoluble and thereby inactive. Inactive protein perturbs cellular function, disrupts membranes and prevents the normal activity and reproduction of DNA thereby essentially killing the microorganism. Antimicrobials can release metal ions into the microbe when the microbe is in fluidic contact with the metal ion, i.e., they are both in the same water medium. The metal ion releases from the substrate it is attached to, diffuses out to the microbe, penetrates the membrane of the microbe, seeks protein, binds to it and then precipitates it.

The term "microbe" herein refers broadly to classes of bacteria, viruses, germs, molds, mildews, fungi, allergens, and other microorganisms.

Figure 18:
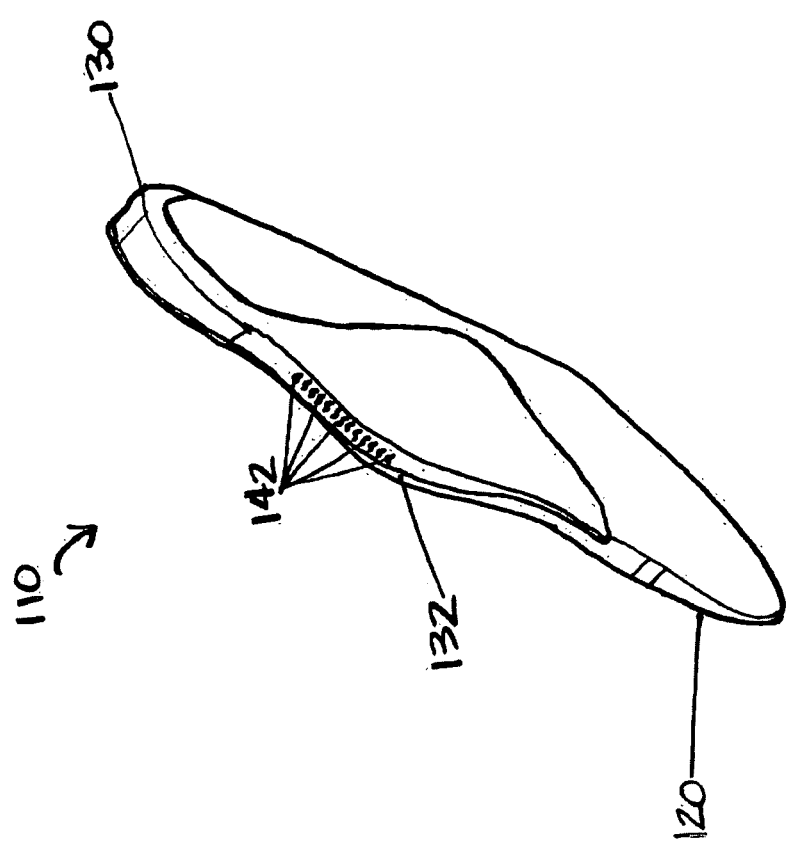
FIG. 18 is a bottom perspective view of another insole.
Figure 19:
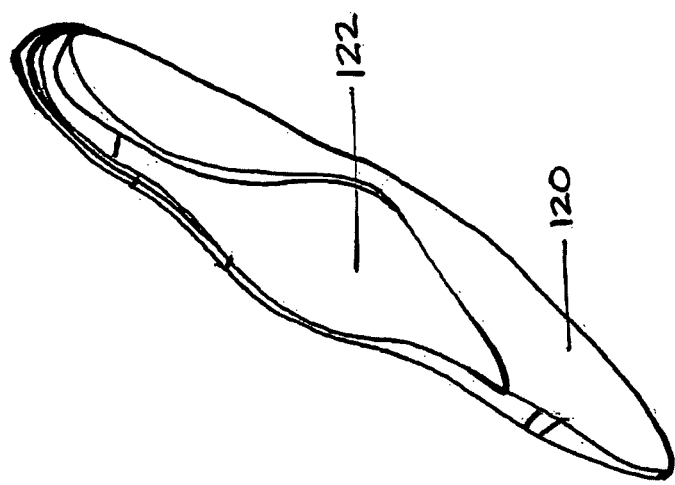
FIG. 19 is a bottom perspective view of a bottom surface of a softer non-arch portion of the insole of FIG. 18.
Figure 20:
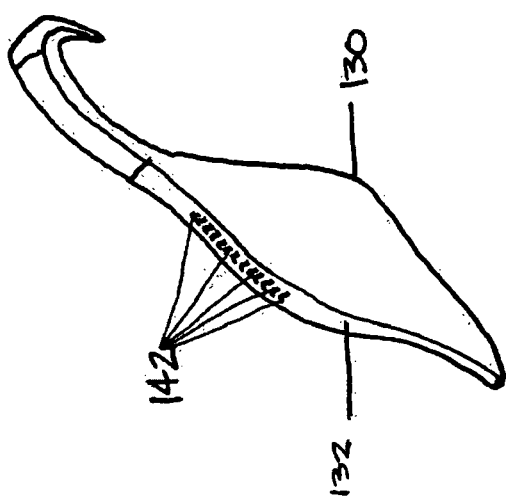
FIG. 20 is a bottom perspective view of a bottom surface of a harder arch/heel portion of the insole of FIG. 18.

FIGS. 18-20 show another example of an insole 110 including the harder arch and heel portion 130 and the softer non-arch portion 120. The non-arch portion 120 can be the same as the non-arch portion 20 shown in FIGS. 1-12. The arch and heel portion 130 includes "V" shaped channels 142 positioned similarly to the "Z" shaped channels 38 shown in FIGS. 11 and 12. The "V" shaped channels 142 are configured to provide for compression when under pressure and provide for a rebound/recovery upon the pressure being unloaded. The "V" shaped channels 142 are oriented such that they resemble less-than (<) or greater-than (>) signs. Other shapes can be used for compression/rebound channels.

Although an athletic shoe is indicated, the orthopedic intermediary support member may be built into nearly any article of footwear, including a running shoe, a tennis shoe, a cross-trainer shoe, a walking shoe, a children's shoe, a work shoe, a dress shoe, a casual shoe, an open-toe shoe, an orthopedic shoe, a sandal, a military shoe, an all-terrain shoe, a diabetic shoe, a specialty shoe, and a boot. In the case of an athletic shoe and similar shoes, soft-sided uppers may be formed of cloth, vinyl, or other flexible materials that yield outwardly under pressure, thereby providing little inward buttressing around the insole. In the case of a boot, the orthopedic intermediary support member may be integrated into the insole of a work boot, a military boot, or a fashion boot. Other embodiments include bicycle seats, knee braces, ankle braces, wrist braces, back braces, limb braces, sports helmets, shin guards, sports (e.g., football, hockey, baseball) elbow, shoulder pads, ski boots, ice skates, in-line skates, wheelchairs, automobile seats, swimming goggles, scuba masks, aquatics, ski masks and others.

While this description has been directed to preferred embodiments, it will be understood by those skilled in the art that various changes in form and details may be made therein without departing from the scope of the appended claims. For example, while many of the procedures have been described in the context of molding specific articles, such as a conformable insole, these same procedures can be easily adapted to molding other conformable products, such as seats and seat cushions, elbow, shin and knee guards, shoulder pads, arm and wrist pads, masks, and body molds and casts.

What is claimed is:

1. A method of manufacturing an apparatus for cushioning and protecting body parts of a human or animal comprising a blend of dual durometer resilient flexible materials with a plurality of degrees of hardness to personalize the properties of comfort, proper fit, structure, and protection; wherein said resilient flexible materials comprise thermoplastic, thermoset, casting, curing, epoxy, or resin materials; and wherein a soft part is customizable, comprising the steps of:

creating a mold with multiple cavities outlining a body part to be protected;
utilizing a rotary, two shot, tool indexing means wherein the molding is either loaded by hand or manual means or loaded by automatic or robotic means;
loading the mold in at least two intervals with similar or dissimilar thermoplastic resins;
loading the first shot of a thermoplastic resin into a first cavity in the mold while the mold is closed;
rotating the mold either by hand or automatically, and loading a second shot of a similar or different thermoplastic resin into a second cavity while the mold remains closed;
bonding the first and second shot thermoplastic resins mechanically and/or chemically to one another.

2. A method for manufacturing of an apparatus for cushioning and protecting a body part of a human or animal comprising:

i) a mold created with multiple cavities outlining a body part to be protected;
ii) a first shot of a thermoplastic resin injected into a first cavity of the mold;
iii) the mold is rotated either manually or automatically and a second mold cavity is exposed when a core/insert inside the mold retracts upon rotation, or shortly thereafter, wherein the vacating of the area by the core/insert creates a second cavity;
iv) a second shot of a similar or different thermoplastic resin is injected into the second cavity of the mold;
v) the entire apparatus is allowed to cool and set;
vi) in doing so the first and second shot thermoplastic resins bond mechanically based on fingers and bores that physically interrelate the two resins in physical proximity; and/or chemically via the surface area interaction of the two resins before either resin is allowed to set;

the similar molecular structures and the surface area proximity of the two thermoplastic resins facilitate the chemical bonding of the two shots.

* * * * *